Figure 1:
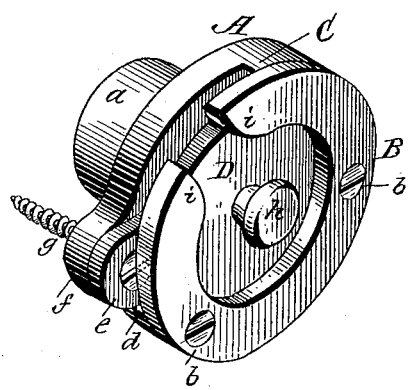

(No Model.)

J. C. PERRY.
WATER FAUCET.

No. 606,025. Patented June 21, 1898.

Witnesses
D. J. Williamson.
Wm. H. DeLacy

Inventor
Joel C. Perry.
per Chas. H. Fowler.
Attorney.

UNITED STATES PATENT OFFICE.

JOEL C. PERRY, OF SOUTH RIVER, NEW JERSEY.

WATER-FAUCET.

SPECIFICATION forming part of Letters Patent No. 606,025, dated June 21, 1898.

Application filed January 26, 1898. Serial No. 668,027. (No model.)

*To all whom it may concern:*

Be it known that I, JOEL C. PERRY, a citizen of the United States, residing at South River, in the county of Middlesex and State of New Jersey, have invented certain new and useful Improvements in Water-Faucets; and I do hereby declare that the following is a full, clear, and exact description of the same, reference being had to the annexed drawings, making a part of this specification, and to the letters of reference marked thereon.

The present invention has for its object to provide a simple and practical faucet for draining off the water from ice-cream tubs, water-barrels, and other vessels or receptacles for holding ice or water; and the invention consists in a faucet constructed substantially as shown in the drawings and hereinafter described and claimed.

Figure 2:
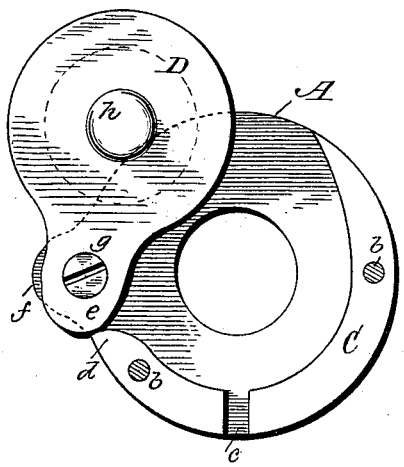
Figure 3:
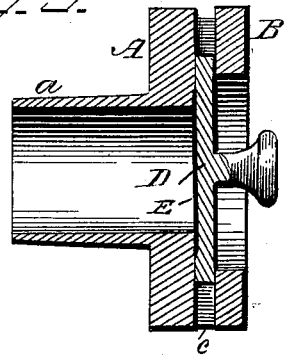

Figure 1 of the drawings is a perspective view of a faucet constructed in accordance with my invention; Fig. 2, a front elevation showing the valve-plate in an elevated position; Fig. 3, a central vertical section of Fig. 1.

In the accompanying drawings, A represents the faucet-head cast or otherwise provided with a tubular extension $a$, adapted to enter the hole in the water vessel or other receptacle.

The front of the faucet-head A is cast with a segmental supporting-flange C partly extending around the outer edge thereof, and upon the flange is secured a segmental collar B by means of the screws $b$, which screws also hold the faucet to the water vessel or receptacle.

The supporting-flange C has a drip-opening $c$ for the escape of any water that may remain between the faucet-head A and the segmental collar B after the water has been drained from the vessel or receptacle.

One end or extremity of the supporting-flange C serves as a stop $d$ for the extension $e$ of a valve-plate D, which closes or opens the faucet, and is pivotally connected to an extension $f$ of the faucet-head A by means of a screw $g$, which screw also assists in holding the faucet to the water vessel or receptacle.

The valve-plate D has a knob $h$ for operating it, and also a suitable packing E, of rubber, leather, or other suitable material, that will serve to form a tight joint between the faucet-head A and the valve-plate D when the latter is closed over the opening of the faucet, as shown in Fig. 3 of the drawings.

The space between the ends of the segmental collar B allows the knob $h$ to pass in opening or closing the faucet, the collar forming a guide for the valve-plate.

A very simple faucet is here provided consisting of only three parts of castings—viz., the faucet-head, with its tubular extension on its rear side and the supporting-flange on its front side, the valve-plate, and the segmental collar.

The ends of the segmental collar B are curved, as shown at $i$, to allow the knob $h$ to freely pass between them.

Having now fully described my invention, what I claim as new, and desire to secure by Letters Patent, is—

A faucet consisting of a faucet-head having a tubular extension and segmental supporting-flange upon its front side, a drip-opening formed in the flange, a pivoted valve-plate having a suitable packing upon its inner side, and a removable segmental collar secured to the segmental flange, substantially as and for the purpose described.

In testimony that I claim the above I have hereunto subscribed my name in the presence of two witnesses.

JOEL C. PERRY.

Witnesses:
GEO. M. COPENHAVER,
WM. H. DE LACY.